United States Patent [19]

Thomas et al.

[11] Patent Number: 5,611,604
[45] Date of Patent: Mar. 18, 1997

[54] SAFETY RESTRAINT SYSTEM HAVING A VARIABLE ANGLE WEB GUIDE OPENING

[75] Inventors: Rudy V. Thomas, Sterling Heights; Philip H. Goniea, Romulus, both of Mich.

[73] Assignee: AlliedSignal Inc., Morristown, N.J.

[21] Appl. No.: 557,443

[22] Filed: Nov. 14, 1995

[51] Int. Cl.⁶ .................................................. B60R 22/00
[52] U.S. Cl. .......................... 297/478; 297/477; 297/483; 280/808
[58] Field of Search ................................. 297/468, 475, 297/476, 477, 478, 483

[56] References Cited

U.S. PATENT DOCUMENTS

| | | | |
|---|---|---|---|
| 3,347,488 | 10/1967 | Quinting | 297/476 X |
| 4,610,480 | 9/1986 | Yamada et al. | 297/478 |
| 5,411,332 | 8/1995 | Verellen | 297/483 |
| 5,495,994 | 3/1996 | Rumpf et al. | 297/478 X |
| 5,544,917 | 8/1996 | Loxton et al. | 280/808 X |

Primary Examiner—Peter R. Brown
Attorney, Agent, or Firm—Markell Seitzman

[57] ABSTRACT

A safety restraint system in which the retractor for the shoulder webbing is pivotably mounted to a structural member associated with the back of the seat. The retractor is pivotable about a horizontal axis transverse to the longitudinal axis of the vehicle. The retractor has a shaft normal to the spool of the retractor and is pivotably locked in a sleeve of a mounting bracket attached to the structural member.

10 Claims, 4 Drawing Sheets

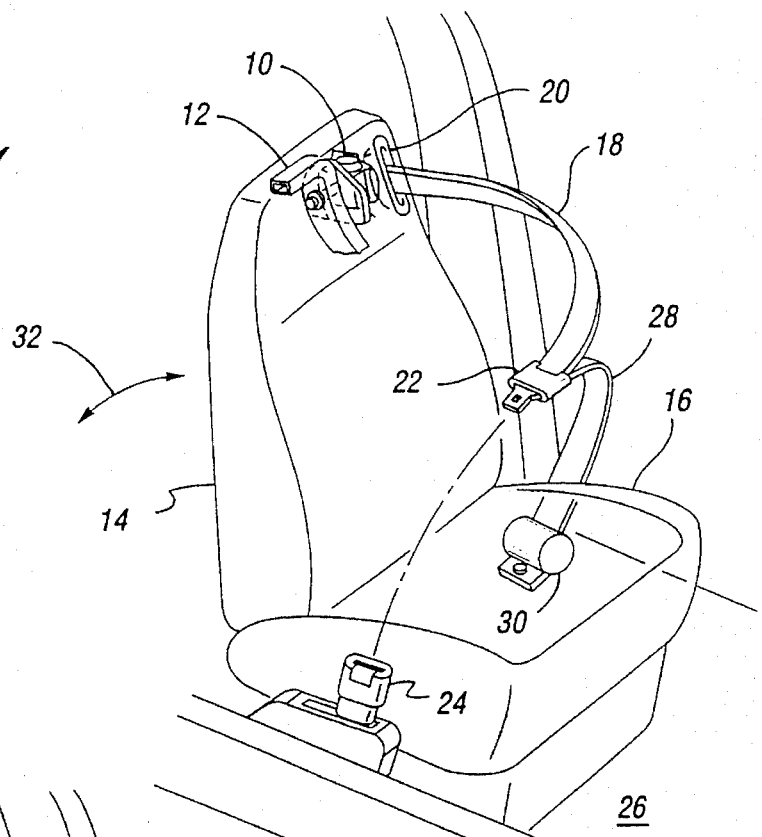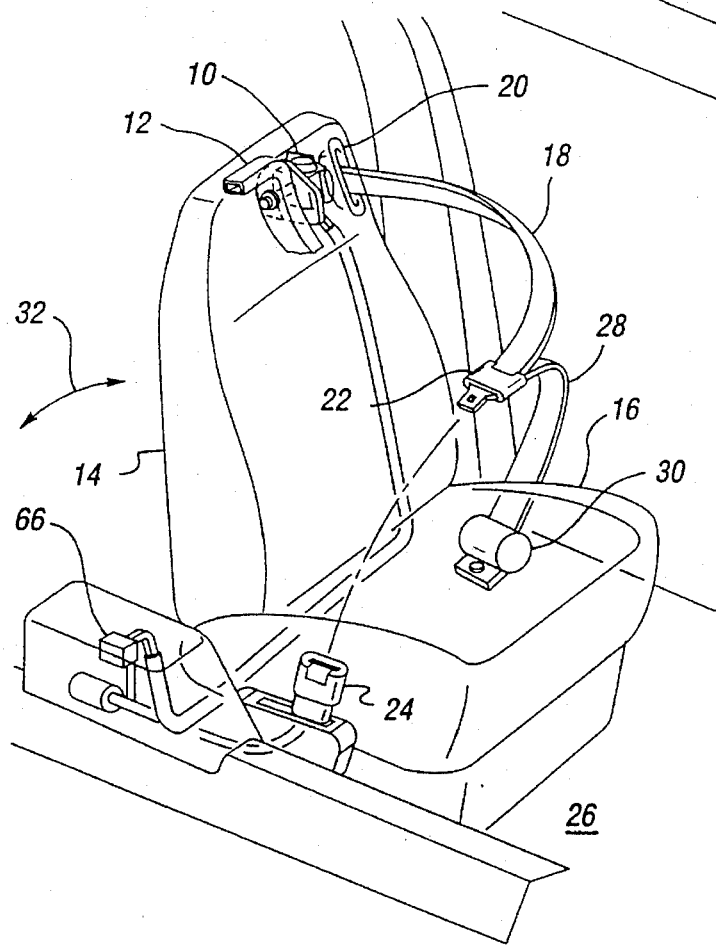

SAFETY RESTRAINT SYSTEM HAVING A VARIABLE ANGLE WEB GUIDE OPENING

BACKGROUND AND SUMMARY OF THE INVENTION

The invention is related to safety restraint systems for automotive vehicles, and in particular, to a retractor system for the shoulder webbing of the safety restraint system having a variable retractor exit angle to provide a better fit of the shoulder webbing on the shoulder of the occupant.

The shoulder webbing of most safety restraint systems is attached to a side pillar of the vehicle. When the back of the seat is reclined, the shoulder of the occupant of the seat becomes separated from the shoulder webbing and it no longer properly fits the occupant nor provides an adequate safety restraint. The retractor of the shoulder webbing may be mounted to a structural member of the back of the seat, however, this changes the angle between the shoulder webbing and the retractor on which it is wound causing the retractor to bind, generating an annoyance to the occupant of the seat that may discourage the use of the shoulder webbing when the seat is inclined.

The object of the invention is to properly fit the shoulder web to the occupant when the back of the seat is reclined.

Another object of the invention is a retractor pivotally mounted to a structural member of the seat's back to provide a variable angle webbing exit.

It is yet another object of the invention to provide retractor lockup independent of the position of the seat's back.

Still another object of the invention is the use of a remote acceleration sensor to lock up the retractor independent of the position of the seat's back.

It is a further object of the invention to provide a retractor system having a solenoid actuator to lock up the retractor in response to an acceleration greater than a predetermined value.

The shoulder webbing retractor system has a mounting bracket fixedly attached to a structural member of the vehicle, the mounting bracket having a horizontal sleeve substantially parallel to the transverse axis of the vehicle. A retractor has a spool on which the shoulder webbing is wound and has a shaft substantially transverse to the spool. The shaft is pivotally received in the sleeve and locked therein. An acceleration sensor is responsive to an acceleration greater than a predetermined value to inhibit the extraction of the shoulder webbing from the retractor's spool.

In the preferred embodiment, the shoulder webbing retractor is pivotally mounted to a structural member of the back of the seat. In a first embodiment of the shoulder webbing retractor system, the acceleration sensor is mounted to the retractor and produces a mechanical output, locking up the retractor when the acceleration exceeds a predetermined value. In an alternative embodiment, the acceleration sensor is an electrical switch remote from the retractor producing an electrical output signal in response to an acceleration greater than a predetermined value. A solenoid actuator associated with the retractor is responsive to the electrical output signal generated by the acceleration sensor to lock up the retractor, prohibiting the extraction of the shoulder webbing from the retractor.

These and other objects of the invention will become more apparent from a reading of the specification in conjunction with the drawings.

BRIEF DESCRIPTION OF THE DRAWINGS

FIG. 1 is a perspective view of a seat having a safety restraint system according to the invention;

FIG. 3 is an exploded view of the components of the invention;

FIG. 4 is a perspective view of a seat having an alternate embodiment of the safety restraint system;

DETAILED DESCRIPTION OF THE DRAWINGS

Figure 2:
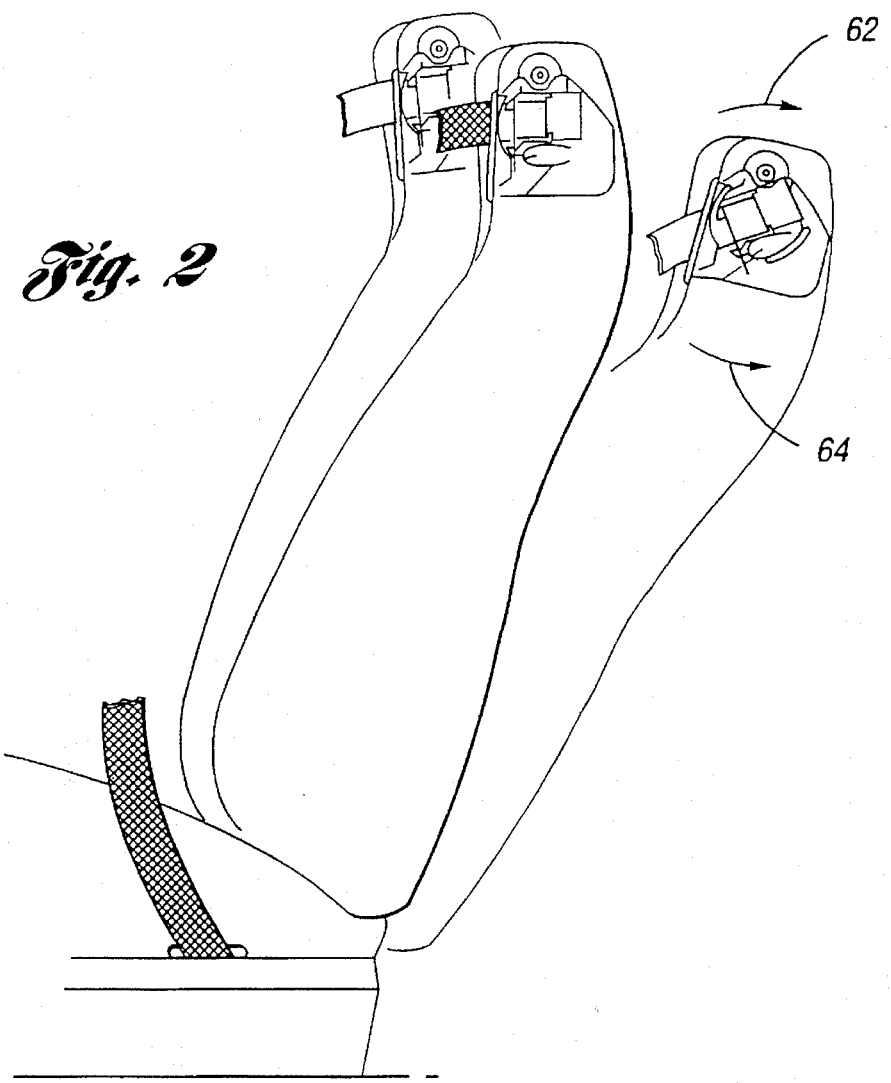
FIG. 2 is a side view of the seat in an upright and reclined position.

The environment of the shoulder webbing retractor system having a variable angle exit angle is shown in FIGS. 1 and 2. Referring to FIG. 1, a shoulder webbing retractor 10 is attached to a structural member 12 of the back 14 of a seat 16 of an automotive vehicle. The shoulder webbing 18 exits the back 14 of the seat through a slot 20 and is connected to a tongue 22 receivable in a buckle 24. The buckle 24 is attached to the floor 26 or other structural member of the seat or the vehicle as is known in the art. A lap webbing 28 has one end connected to the tongue 22 and the opposite end connected to an optional second retractor 30 of conventional design or connected to the floor or to a seat anchor. The second retractor 30 may also be attached to the floor 26, a structural member of the seat 16 or any other structural member of the vehicle. As in current automotive vehicles, the back of the seat may be pivoted backward and forward relative to the seat 16 as indicated by arrow 32.

FIG. 2 shows that shoulder webbing retractor 10 is pivotal about a horizontal axis transverse to the longitudinal axis of the vehicle to accommodate for various angular positions of the back 14. The location of the shoulder webbing 18 within the slot 20 changes with the angular position of the back 14 to correctly position the shoulder webbing 18 on the occupant's shoulder.

FIG. 3 shows the pivotal mounting of the retractor 10 to the structural member of the back 14 of the seat. Although the shoulder webbing retractor system is discussed and shown as being pivotally mounted to a structural member of the back of the seat, those skilled in the art will recognize that it may be pivotably attached to a side pillar or other structural member of the vehicle. The structural member 12 is preferably a rectangular-shaped member as shown in FIGS. 1 and 2. A mounting bracket 34 is fixedly attached to the structural member 12. The mounting bracket 34 has a face portion 38, a cylindrical sleeve 36 which extends substantially horizontally parallel to the traverse axis of the vehicle through the structural member 12, and a flange 42 substantially normal to the face portion 36, of the mounting bracket. The flange 42 has a slot 44 which is aligned with the slot 20 provided in the back 14 of the seat.

A plate 46 having a cylindrical bushing 48 is slidably received in the cylindrical sleeve 36 of the mounting bracket 34. The plate 46 also has a clearance hole 50 receiving therethrough a bolt 52 to inhibit the rotation of the plate 46 relative to the mounting bracket 34 and the back of the seat. The bolt 50 is threaded into an internally threaded nipple 40 provided on the structural member 12. The retractor 10 is of a conventional design and has a shaft 54 which extends substantially normal to the axis of the retractor's spool on which the shoulder webbing 18 is wound.

The shaft 54 is pivotably received through the cylindrical bushing 48 and exits the cylindrical sleeve 38 on the side opposite the retractor 10. A cap bushing 56 rotatably supports the end of the shaft 54 in the sleeve 36 at the end opposite the mounting plate 46. A "C" lock spring 58 is received in an annular groove 60 provided adjacent to the end 62 of the shaft to lock the shaft 54 in the sleeve 36.

The shoulder webbing 18 extends through the slot 44 and through the slot 20 of the seat. As shown in FIG. 2, the slots 44 and 20 permit the retractor 10 to pivot about the axis of the shaft 54 changing the exit angle of the shoulder webbing 18 to provide a proper fit of the shoulder webbing 18 to the shoulder of the occupant of the seat 16 independent of the position of the back 14 to the seat 16.

In FIG. 2, when the back 14 of the seat is reclined, the retractor 10 is rotated in a clockwise direction indicated by arrow 62. However, the retractor is rotated in the opposite direction, indicated by arrow 64 due to the change of position of the shoulder webbing 18 within the slots 44 and 20 to provide a proper fit for the occupant of the seat. The two rotations 62 and 64 are in opposite directions and partially complement each other so that the rotation of the retractor 10 is smaller than might otherwise be expected. However, this compensation is not exact and results in small but acceptable reduction in the sensitivity of the acceleration sensor, such as a standing mass (also called a standing man) acceleration sensor normally embodied in the retractor 10. With this arrangement, the webbing 18 remains engaged with the shoulder of the occupant in the event of a rapid deceleration of the vehicle independent of the position of the seat's back.

Figure 5:
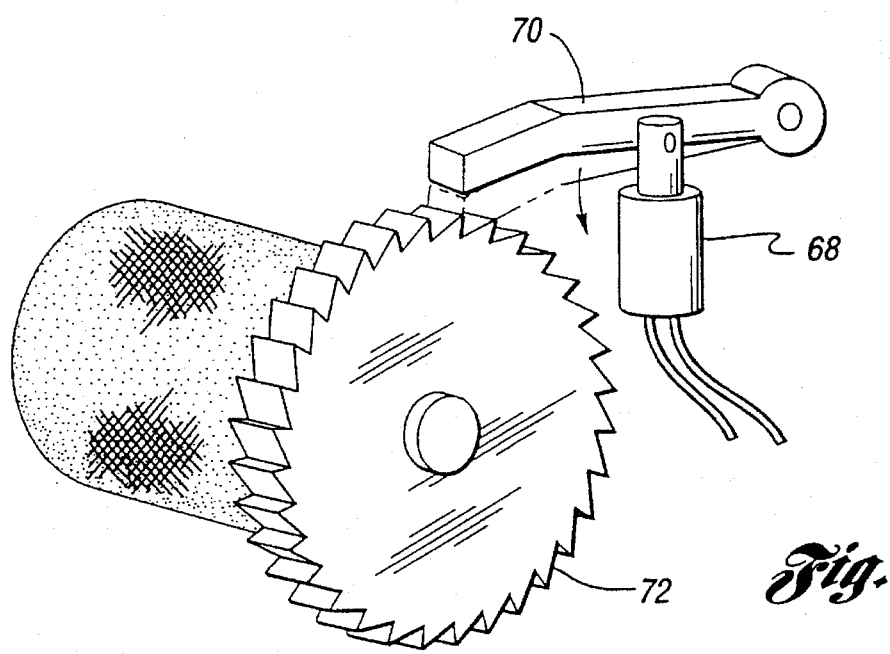
FIG. 5 is a partial view showing the relationship of the solenoid actuator to the locking pawl.

In an alternate embodiment shown in FIG. 4, the acceleration sensor 66 is remotely mounted to the floor 26 or other structural member of the vehicle where it is independent of the position of the seat's back 14. The acceleration sensor 66 in this embodiment is in the form of an electrical switch 67 which will provide electric power to a solenoid actuator 68 mechanically linked to the lock pawl 70 of the retractor 10, as shown in FIG. 5. When the acceleration or deceleration of the vehicle is greater than a predetermined value, such as the deceleration resulting from a collision, the electrical switch 67 will activate the solenoid actuator 68. When activated, the solenoid actuator 68 will displace the lock pawl 70 to engage the ratchet wheel 72 of the retractor 10 prohibiting the extraction of shoulder webbing 18 from the retractor.

Figure 6:
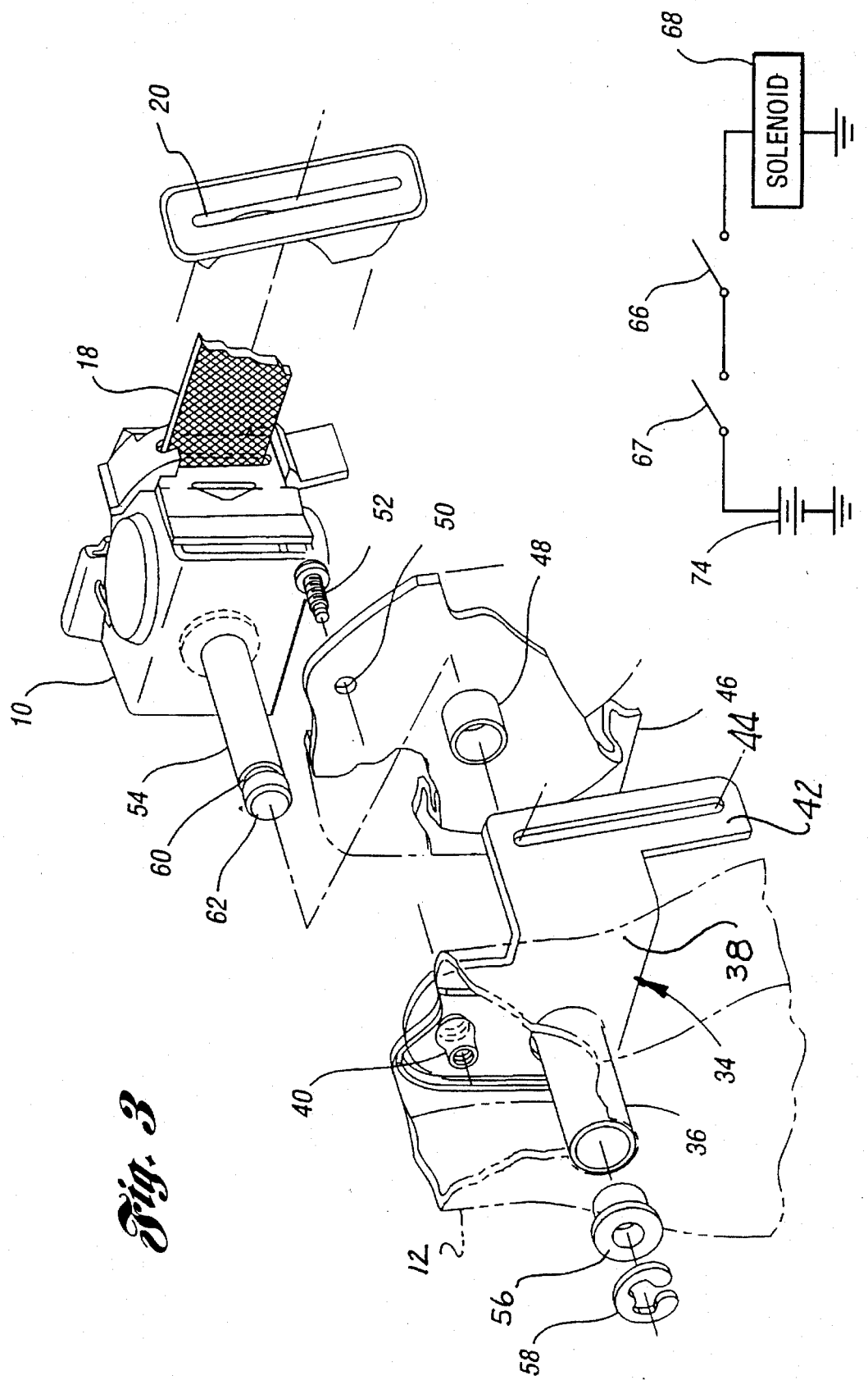
FIG. 6 is an electrical diagram of the safety restraint system of FIG. 4.

Electrical power is provided to the acceleration sensor 66 through a buckle switch 67 incorporated in the buckle 24. The buckle switch 67 receives electrical power from the vehicle's source of electrical power, such as a battery 74, and is a normally open switch. The buckle switch 67 is closed by the occupant inserting the tongue 22 into the buckle 24 closing buckle switch 74 and providing electrical power to the acceleration sensor 66 as shown in FIG. 6. In the event of an acceleration exceeding the predetermined value, the acceleration sensor 66 will provide electrical power to activate the solenoid actuator 68. Activation of the solenoid actuator 68 displaces the lock pawl 70 into engagement of the ratchet wheel 72 attached to spool 76 on which the shoulder webbing is wound. The engagement of the lock pawl 70 with the ratchet wheel 72 will prevent extraction of the shoulder webbing 18 from the retractor 100.

The retractor 100 is pivotably mounted to a structural member 12 of the back 14 of the seat and is pivotable about a substantially horizontal axis parallel to the transverse axis of the vehicle as discussed relative to FIGS. 1 and 2. Because the orientation of the acceleration sensor 66 is independent of this position of the back 14 of the seat 16, the sensitivity of the system does not change with the position of the back 14 as it is reclined from an upright position.

Figure 7:
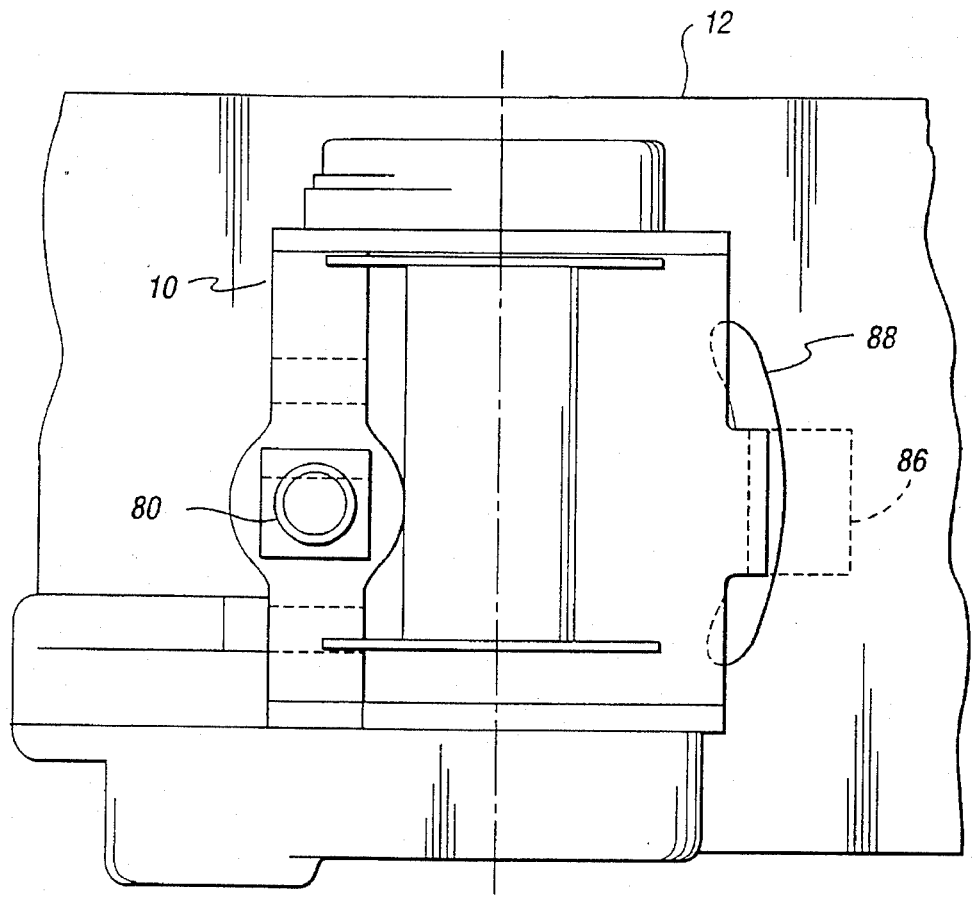
FIG. 7 is a front view of an alternate mounting arrangement.
Figure 8:
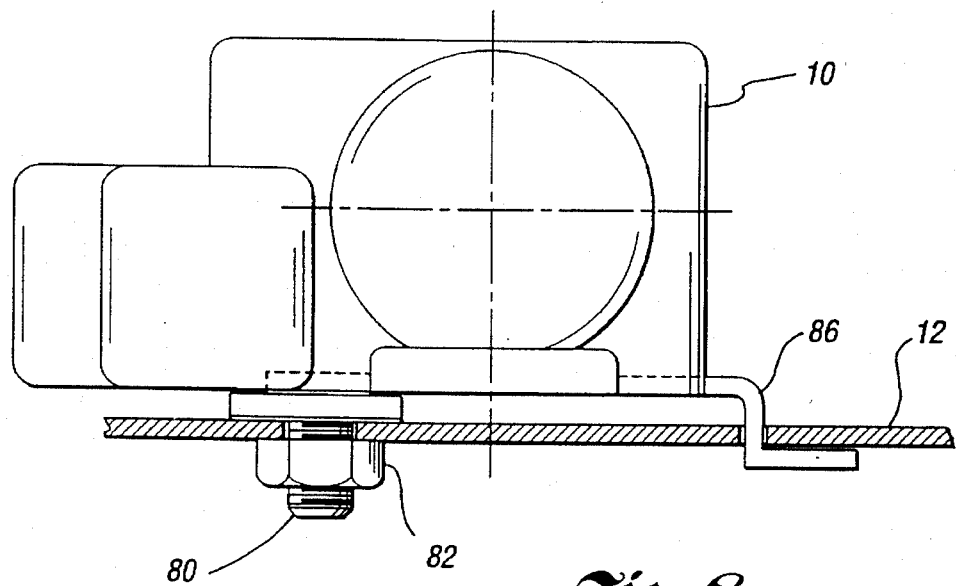
FIG. 8 is a side view of the alternate mounting arrangement.

In contrast to the mounting arrangement shown in FIG. 3, the retractor 10 may be pivotably mounted to the structural member 12 using a shouldered stud 80 welded to the retractor 10 as shown in FIGS. 7 and 8. The stud 80 is threaded and passes through an opening provided in the structural member 12 and secured therein by a nut 82. A washer 84 circumscribing the stud 80 pivotably supports the retractor 10 to the structural member 12.

The retractor 10 also has a stepped tongue 86 which is received through an arcuate slot 88 provided through the structural member 12. The arcuate slot 88 limits the rotation of the retractor 10 relative to the structural member.

A comparable structure may be provided with the structural arrangement shown in FIG. 3 in which the stepped tongue 86 may be received through an arcuate slot provided in the plate.

Having disclosed a best mode of the invention, it would be possible for one skilled in the art to make certain changes or improvements thereto as set forth in the appended claims.

We claim:

1. A retractor system in communication with a shoulder webbing of a safety restraint system, said retractor system being mounted in an automotive vehicle and comprising:

a shoulder webbing retractor pivotably mounted to a structural member of the vehicle, said retractor pivotable about a horizontal axis transverse to the longitudinal axis of the vehicle and having a spool, on which the shoulder webbing is wound, disposed normal to said horizontal axis; and an acceleration sensor operatively connected to the shoulder webbing retractor and inhibiting the extraction of the shoulder webbing from said spool in response to an acceleration having a value greater than a predetermined value.

2. The retractor system of claim 1 wherein said structural member is located in a backrest of a seat of the vehicle.

3. The retractor system of claim 2 wherein said structural member of said backrest has a mounting bracket fixedly attached thereto, said mounting bracket having a sleeve disposed substantially parallel to said horizontal axis; and wherein said retractor has a shaft normal to said spool pivotably retained in said sleeve.

4. The retractor system of claim 3 wherein said mounting bracket includes a slot defining the maximum and minimum angular excursion of said shoulder webbing relative to the structural member.

5. The retractor system of claim 3 wherein said shaft has a distal end exiting said sleeve at the end opposite said retractor, said retractor system further including a "C" lock spring received in a groove provided in said distal end external to said sleeve to secure said shaft in said sleeve.

6. The retractor system of claim 3 wherein said retractor has a shouldered stud attached to said retractor normal to said spool, said shouldered stud having a threaded distal end extending through an aperture provided in the structural member, and a nut threaded on said threaded distal end to secure said retractor to the structural member of the back of the seat.

7. The retractor system of claim 1 wherein said acceleration sensor comprises:

an inertial mass acceleration sensor producing a mechanical output in response to an acceleration greater than a predetermined value; and means responsive to said mechanical output to prohibit the extraction of the shoulder webbing from said spool.

8. The retractor system of claim 1 wherein said acceleration sensor comprises:

an electrical switch connected to a source of electrical power operative to produce an electrical output in response to an acceleration greater than said predetermined value;

a solenoid actuator response to the electrical output from said electrical switch to produce a mechanical output; and means responsive to said mechanical output of said solenoid actuator to prohibit the extraction of said shoulder webbing from said spool.

9. The seat belt system of claim 8 wherein retractor has a ratchet wheel attached to said spool said means responsive to said mechanical output comprises:

a lock pawl displaced by said mechanical output to engage said ratchet wheel and prohibit the rotation of said spool in a direction in which said shoulder webbing is extracted therefrom.

10. The seat belt system of claim 1 further including a mounting plate having a first cylindrical bushing extending into said sleeve at the end adjacent to said retractor and an end cap having second cylindrical bushing extending into said opposite end of said sleeve, said first and second bushing pivotably supporting said shaft.

* * * * *